United States Patent [19]

Baney et al.

[11] Patent Number: 5,340,979
[45] Date of Patent: Aug. 23, 1994

[54] TECHNIQUE FOR DETERMINING THE AMPLIFIED SPONTANEOUS EMISSION NOISE OF AN OPTICAL CIRCUIT IN THE PRESENCE OF AN OPTICAL SIGNAL

[75] Inventors: Douglas M. Baney, Los Altos; John J. Dupre, Santa Rosa, both of Calif.

[73] Assignee: Hewlett-Packard Company, Palo Alto, Calif.

[21] Appl. No.: 951,682

[22] Filed: Sep. 25, 1992

[51] Int. Cl.$^5$ ................................................ H01J 40/14
[52] U.S. Cl. ............................. 250/214 B; 250/214 A
[58] Field of Search ........ 250/214 VT, 214 B, 214 R, 250/214 LA, 214 G, 214 A; 372/25, 31; 385/24, 39; 359/337, 333

[56] References Cited

U.S. PATENT DOCUMENTS

| 4,341,956 | 7/1982 | Bax | 250/214 C |
| 5,088,095 | 2/1992 | Zirngibl | 372/94 |
| 5,117,196 | 5/1992 | Epworth et al. | 372/31 |

Primary Examiner—Edward P. Westin
Assistant Examiner—T. Davenport
Attorney, Agent, or Firm—William C. Milks, III

[57] ABSTRACT

A method for determining the amplified spontaneous emission noise of an optical circuit, such as an optical amplifier, in the presence of an optical signal includes applying a pulsed optical signal of prescribed intensity to an input of an optical circuit under test, and detecting an output signal from the optical circuit slightly after the pulsed optical signal is switched from on to off. The output signal immediately after the optical signal is switched off represents the amplified spontaneous emission noise of the optical circuit in the presence of an optical signal of the prescribed intensity. In a first embodiment, an optical spectrum analyzer is used for detecting the output signal. In a second embodiment, the output signal is passed through a narrow band optical filter to a photodetector. An electrical spectrum analyzer displays the detected waveform. When necessary, the observed output signal is extrapolated to a time immediately after the optical signal is switched off.

22 Claims, 7 Drawing Sheets

TECHNIQUE FOR DETERMINING THE AMPLIFIED SPONTANEOUS EMISSION NOISE OF AN OPTICAL CIRCUIT IN THE PRESENCE OF AN OPTICAL SIGNAL

FIELD OF THE INVENTION

This invention relates to optical circuits and, more particularly, to methods and apparatus for determining the amplified spontaneous emission noise of an optical circuit having gain, such as an optical amplifier, in the presence of an optical signal using a gated or pulsed source technique.

BACKGROUND OF THE INVENTION

Optical amplifiers are commonly used in optical communication systems. One of the parameters that is important in characterizing an optical amplifier is amplified spontaneous emission (ASE) noise in the presence of an optical signal. The amplified spontaneous emission noise represents a noise signal that is generated within the optical amplifier and is amplified by the amplifier. The ASE noise typically has a wider bandwidth than the optical signal. The measurement of ASE noise is important in determining the noise figure of an optical amplifier as well as ASE buildup in communication systems, where ASE noise can limit performance.

The output of an optical amplifier includes a narrow band optical signal and broader band noise generated within the amplifier. When no signal is present, the amplifier generates and amplifies noise. However, when an optical signal is present, the output noise level is reduced in comparison with the noise level in the absence of an optical signal due to amplifier gain reduction. The gain reduction depends on the amplitude of the optical signal. Thus, in order to accurately characterize amplifier performance, the ASE noise must be measured at an optical signal level and wavelength that corresponds to normal operation.

In accordance with one previously reported technique, referenced here as the delta technique, the ASE noise measurement is performed by measuring ASE noise about the optical carrier, as shown in a spectral display on an optical spectrum analyzer. The actual noise at the optical signal wavelength is then inferred from an interpolation of the measured data. The delta technique is influenced by a combination of finite optical filter selectivity, finite optical signal bandwidth and optical signal sidemodes. These problems become important for large signal levels and for lasers such as distributed feedback (DFB) or distributed Bragg reflector (DBR) lasers, which often have poor sidemode suppression levels.

Another technique for ASE noise measurement is reported by J. Aspell et al in *Optical Fiber Communication*, Vol. 5, 1992 OSA Technical Digest Series, (Optical Society of America, Washington, D.C. 1992), paper THA4. The ASE noise is measured in the presence of an optical signal by ensuring that the optical signal is polarized and using a polarizer located after the source of ASE noise to reject the signal and pass half of the ASE noise. This technique assumes that the ASE noise levels in each of two orthogonal polarizations are equal. The disclosed technique is relatively complex, and its application to testing ASE noise in the presence of multiple optical signals is questionable.

It is a general object of the present invention to provide improved methods and apparatus for determining the ASE noise of an optical amplifier in the presence of an optical signal.

It is another object of the present invention to provide methods and apparatus for determining ASE noise using a pulsed or gated optical source.

It is a further object of the present invention to provide methods and apparatus for determining ASE noise wherein the deleterious effects of optical signal excess noise and sidemodes are avoided.

It is yet another object of the present invention to provide methods and apparatus for determining ASE noise in the presence of the effects of closely-spaced optical signals.

It is still another object of the present invention to provide methods and apparatus for determining ASE noise using a relatively uncomplicated optical system.

SUMMARY OF THE INVENTION

According to the present invention, these and other objects and advantages are achieved in methods and apparatus for determining the ASE noise of an optical circuit in the presence of an optical signal. The optical circuit is typically an optical amplifier. The method of the invention comprises the steps of applying an optical signal of prescribed intensity to an input of an optical circuit under test, rapidly switching the applied optical signal off, and detecting an output signal from the optical circuit slightly after the optical signal is switched off. The optical circuit output signal immediately after the optical signal is switched off is representative of the ASE noise of the optical circuit in the presence of an optical signal of the prescribed intensity. When necessary, the method includes the step of extrapolating an observed output signal to a time immediately after the optical signal is switched off.

The steps of applying an optical signal and rapidly switching the optical signal off preferably include applying a pulsed optical signal to the input of the optical circuit. The pulsed optical signal can be generated by mechanically chopping a continuous optical signal or by pulse modulating a continuous optical signal.

In a first embodiment of the invention, the transient output signal is detected with an optical spectrum analyzer set to the optical signal wavelength, and set to zero span. In this mode, the optical spectrum analyzer provides a time domain display of the output of the optical circuit. The value of the observed signal immediately after the optical signal is switched off is representative of the ASE noise of the optical circuit.

In a second embodiment of the invention, the output signal is detected by passing the output signal of the optical circuit through a narrow band optical filter and detecting the filtered output signal with a high speed photodetector. The filtered and detected output signal of the optical circuit is input to an electrical spectrum analyzer set to zero span. The electrical spectrum analyzer provides a time domain display of the detected signal. The value of the signal immediately after the optical signal is switched off is representative of the ASE noise of the optical circuit. The method of the present invention is typically used for measuring the ASE noise of an erbium-doped fiber amplifier. However, the technique of the present invention can be used to determine the ASE noise of any optical circuit wherein the transient output signal after the optical signal is switched off can be observed.

BRIEF DESCRIPTION OF THE DRAWINGS

For a better understanding of the present invention, together with other and further objects, advantages and capabilities thereof, reference is made to the accompanying drawings, which are incorporated herein by reference and in which.

DETAILED DESCRIPTION OF THE INVENTION

Figure 1:
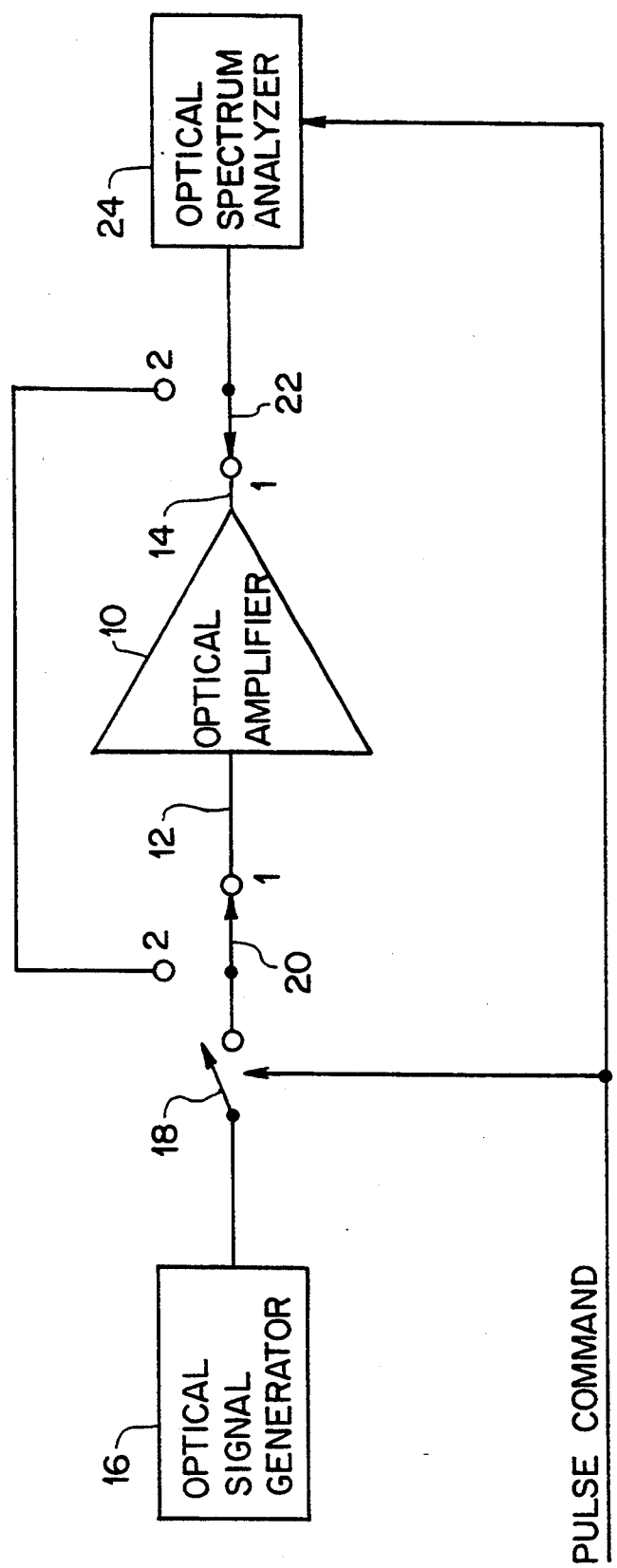
FIG. 1 is a block diagram of a system for determining ASE noise in the presence of an optical signal in accordance with the present invention.

A block diagram of an apparatus for measuring the ASE noise of an optical amplifier in the presence of an optical signal is shown in FIG. 1. An optical amplifier 10 under test has an input and an output 14. The optical amplifier 10 is typically an erbium-doped fiber amplifier (EDFA). An output of an optical signal generator 16 is coupled through a switch 18 and a switch 20 to the input 12 of optical amplifier 10. As discussed below, the optical signal generator 16 is typically a laser, such as a distributed feedback (DFB) laser, having a substantially monochromatic output. Output 14 of optical amplifier 10 is coupled through a switch 22 to an input of an optical spectrum analyzer 24. The switch 18 provides a pulsed, or gated, optical signal. Various embodiments of the switch 18 are described below. The switches 20 and 22 each have a position 1 and a position 2. For ASE noise measurements, switches 20 and 22 are both in position 1, as shown in FIG. 1. For measuring the input to optical amplifier 10, switches 20 and 22 are both in position 2, and the pulsed optical signal is connected directly to the input of optical spectrum analyzer 24. A pulse command signal controls switch 18 and triggers optical spectrum analyzer 24. In a preferred embodiment, the optical spectrum analyzer 24 is a Model 71451A, manufactured and sold by Hewlett-Packard Company.

Figure 2:
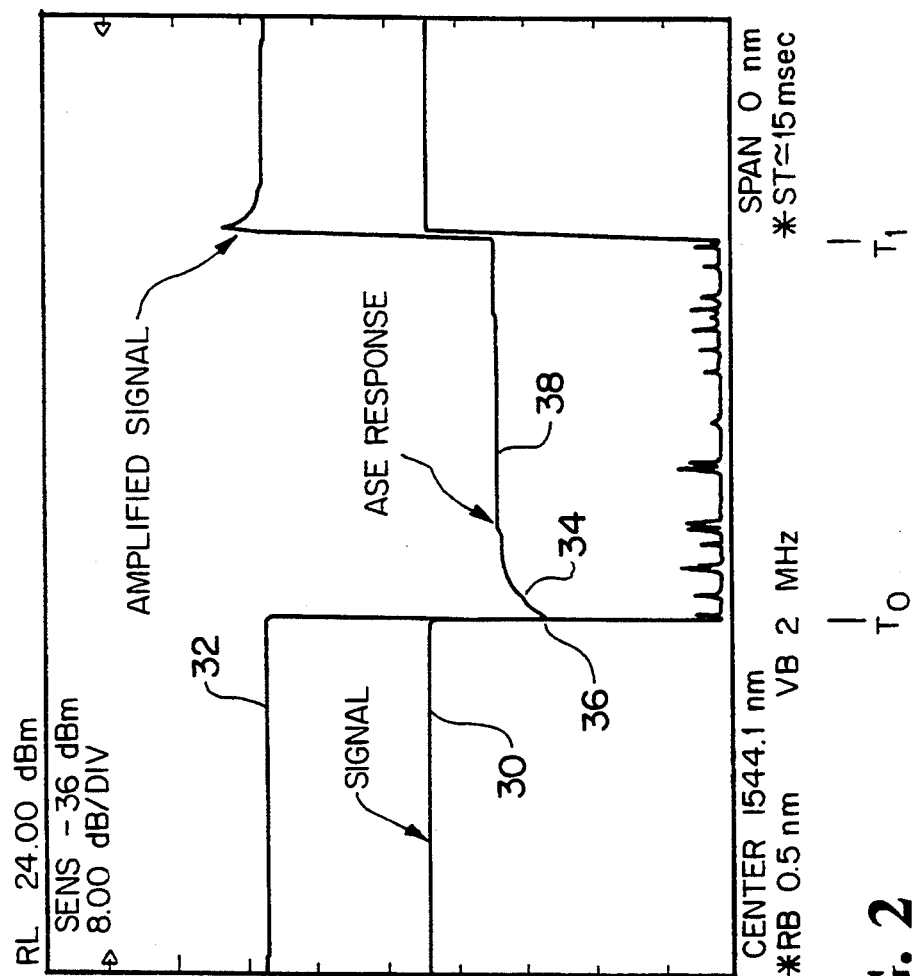
FIG. 2 is a graph of input and output waveforms of the optical amplifier of FIG. 1 as a function of time.

The method for measuring ASE noise in accordance with the present invention is described with reference to FIGS. 1 to 3. The optical signal at input 12 of optical amplifier 10 is represented in FIG. 2 as a pulsed input optical signal 30, as detected by optical spectrum analyzer 24. In FIG. 2, the optical spectrum analyzer 24 is set to zero span at the wavelength of optical signal generator 16, and the signal intensity is plotted as a function of time. The sweep time in the example of FIG. 2 is 15 milliseconds. The resolution bandwidth of the optical spectrum analyzer 24 is preferably set to about 0.5 to 1.0 nanometer. In FIG. 2, the resolution bandwidth is set to 0.5 nanometer. An output of optical amplifier 10 is represented by amplified optical signal 32 in FIG. 2. At time $T_0$, the input optical signal 30 is switched from on to off by switch 18. As shown, amplified output signal 32 changes at time $T_0$. At time $T_1$, the input optical signal is switched back on, and the cycle is repeated.

After the input optical signal 30 is switched off at time $T_0$, the output signal 32 exhibits an ASE transient 34. In particular, the transient 34 that is observed on optical spectrum analyzer 24 begins at a level 36 and decays upwardly to a level 38. The level 38 represents the ASE noise intensity in the absence of an optical signal. In an erbium-doped fiber amplifier, the transient 34 has a time constant on the order of about 300 microseconds. The upward transient from level 36 to level 38 represents an increase in ASE noise. The transient 34 in the ASE noise is a result of gain reduction that occurs in optical amplifier 10 when an optical signal is present. When the input optical signal 30 is switched off, the gain reduction no longer occurs, and the ASE noise increases in intensity. The output optical intensity immediately after the input optical signal 30 is switched off represents the ASE noise in the presence of an optical signal having the wavelength and intensity of input optical signal 30. As discussed below, the level 36 observed on the optical spectrum analyzer 24 may differ from the level immediately after the optical signal is switched off, and extrapolation may be required.

Figure 3:
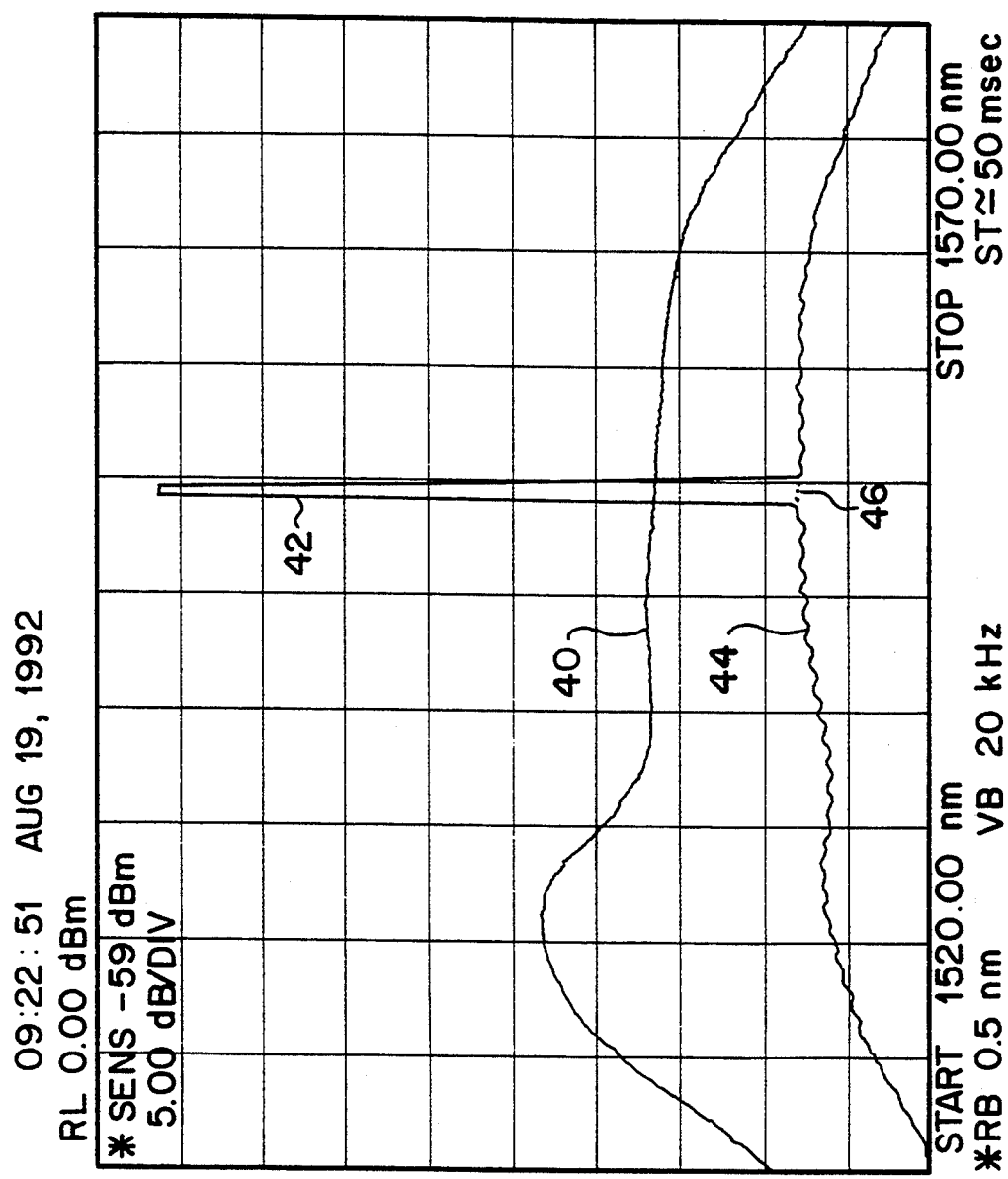
FIG. 3 is a spectrum of ASE noise with and without an optical signal present.

The spectrum of the ASE noise with and without an optical signal is shown in FIG. 3. Line 40 represents the spectrum of ASE noise over a span of 1520 nanometers to 1570 nanometers, in the absence of an optical signal. Curve 42 represents the spectrum of an optical signal at about 1549 nanometers and ASE noise. A level 44 of curve 42 represents ASE noise outside the optical signal band. The level 44 of ASE noise in the presence of an optical signal is suppressed in comparison with the ASE noise represented by line 40. The ripple in level 44 is caused by unwanted source excess noise. Dotted line 46 represents the level of ASE noise at the optical signal wavelength and is the quantity to be measured. By comparison of FIGS. 2 and 3, it can be seen that level 38 in FIG. 2 and line 40 in FIG. 3 both represent ASE noise in the absence of an optical signal. Level 36 in FIG. 2 and level 44 in FIG. 3 both represent ASE noise in the presence of an optical signal.

Figure 4:
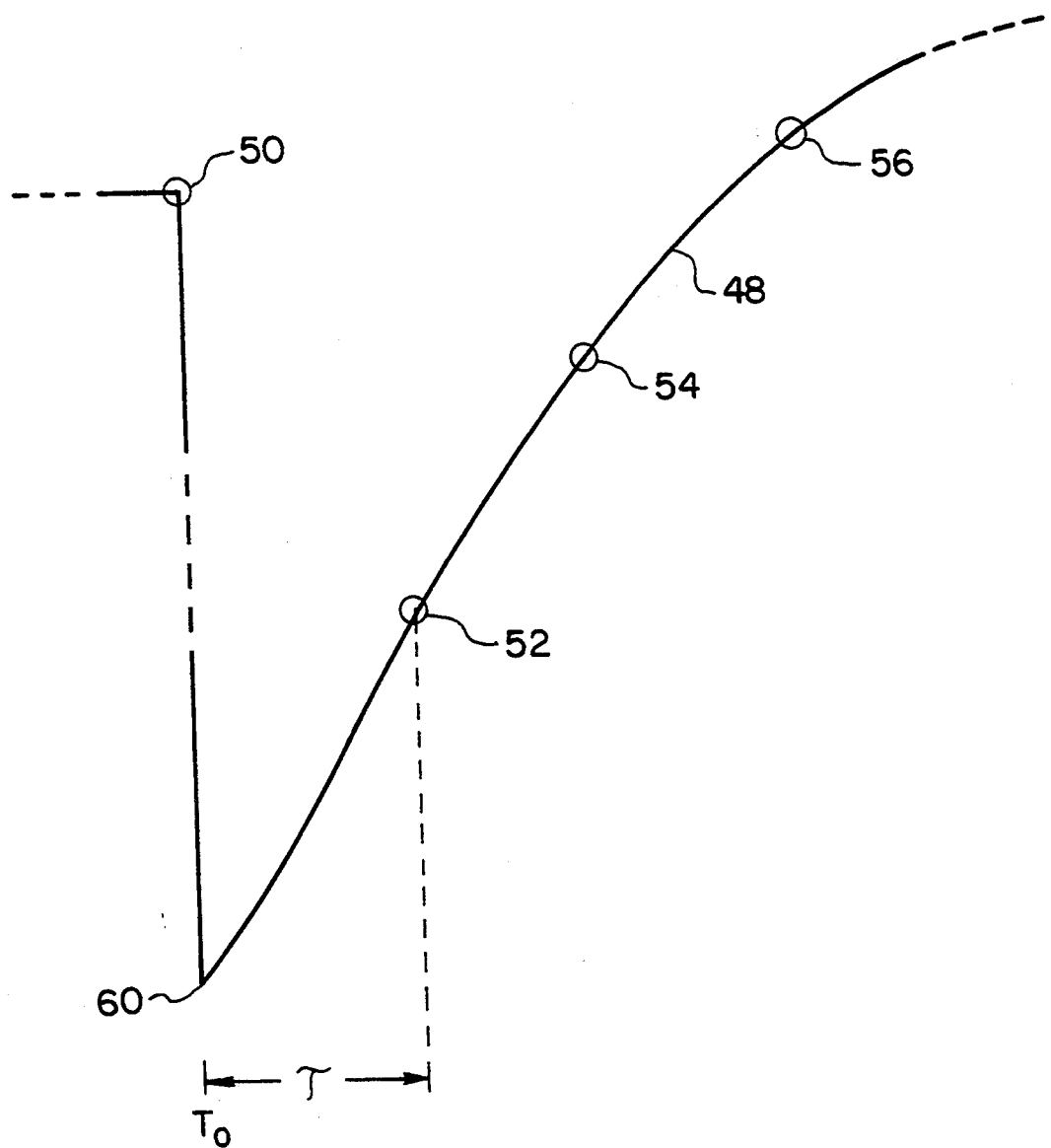
FIG. 4 is a graph of ASE noise as a function of time that illustrates extrapolation in accordance with the present invention.

As indicated above, the desired ASE noise level in the presence of an optical signal is the minimum value of the ASE transient 34 that occurs immediately after the input optical signal 30 is switched off. It will be understood that, depending on the measurement equipment used, the observed level 36 may differ from the actual minimum value of the transient 34. For example, the optical spectrum analyzer 24 may sample the optical amplifier output signal once every $\tau$ microseconds, where $\tau$ is typically 38 microseconds. Thus, if one sample is taken at the instant when the input optical signal is switched off, and the next sample is taken 38 microseconds later, the level 36 will be measured about 38 microseconds after the minimum value of transient 34 has occurred. To avoid measurement inaccuracies that could result, the observed transient 34 is extrapolated to a time immediately after the optical signal is switched off. With reference to FIG. 4, curve 48 is an enlargement of the ASE noise transient 34 that occurs after the optical signal 30 is switched off at time $T_0$. Assume that a sample 50 is taken at time $T_0$ and that a sample 52 is taken 38 microseconds later. Samples 54, 56, etc. are taken at subsequent intervals of 38 microseconds. It can be seen from FIG. 4 that sample 52 would indicate a minimum value of transient 34 that differs from the actual minimum value 60. The actual minimum value 60 is obtained by extrapolation from samples 52, 54, 56, etc. The extrapolation can be done using an exponential curve fitting to extrapolate to minimum value 60. However, it has been found that the ASE transient 34 is not always exponential. When exponential curve fitting is not appropriate, a straight line approximation can be utilized. Thus, the first few points such as samples 52, 54, 56 can be used as a straight line approximation to extrapolate to minimum value 60.

While an optical spectrum analyzer is the preferred instrument for measuring ASE noise in the presence of an optical signal, it will be understood that other suitable instruments can be utilized. For example, the optical amplifier output including transient 34 can be passed through a narrow band optical filter having a bandwidth on the order of about 0.5 nanometer to 1.0 nanometer to a photodetector. The speed of the photodetector should be much faster than the time constant of the ASE transient. Preferably, the photodetector should have a time constant that is less than one-tenth of the time constant of the ASE transient. By way of example, for an erbium-doped fiber amplifier wherein the ASE transient 34 has a time constant of 300 microseconds, a photodetector having a switching speed of one microsecond gives a good representation of the ASE transient. It will be understood that the speed of the amplifier that follows the photodetector must also be taken into account in determining measurement speed.

Figure 7:
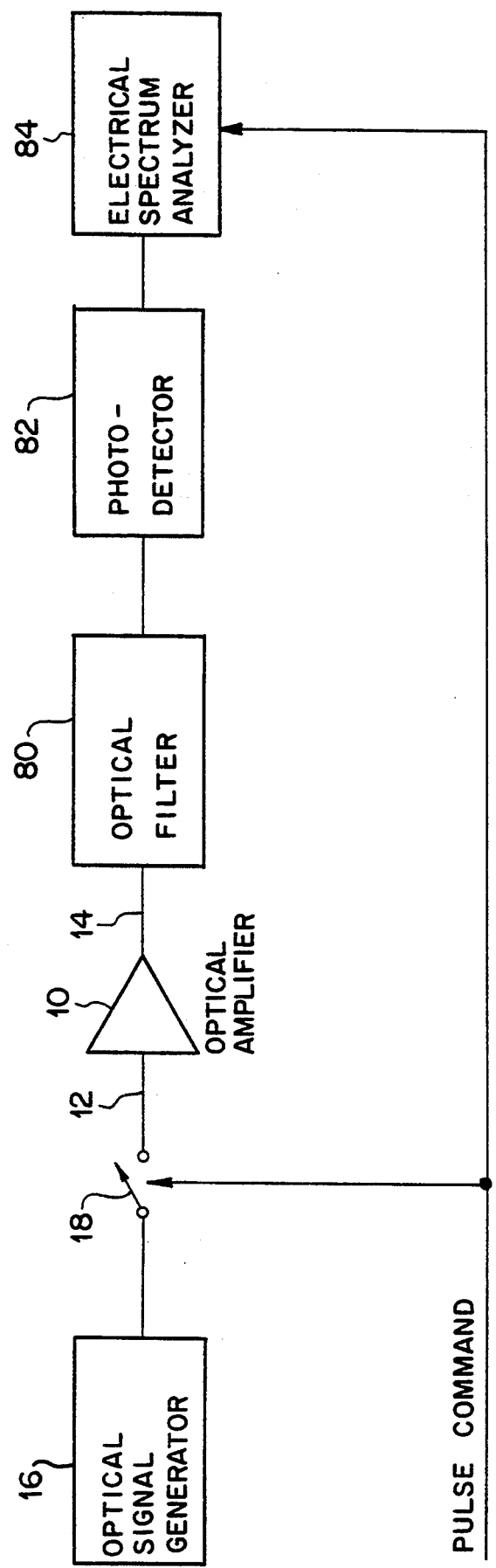
FIG. 7 is a block diagram of a system for determining ASE noise in the presence of an optical signal in accordance with an alternate embodiment of the present invention.

An alternate way to implement the pulsed source technique for measuring ASE noise in accordance with the present invention is illustrated in FIG. 7. Like elements in FIGS. 1 and 7 have the same reference numerals. The output of optical signal generator 16 is coupled through switch 18 to the input 12 of optical amplifier 10. Output 14 of optical amplifier 10 is coupled through a narrow band optical filter 80 to a photodetector 82. The optical filter 80 preferably has a bandwidth of 5 nanometers or less. The selection of filter bandwidth is a tradeoff between resolution and signal strength. A very narrow band filter 80 provides high resolution, but the output signal strength is weak. The photodetector 82 detects the optical signal and noise added by optical amplifier 10 and produces an electrical signal which is input to an electrical spectrum analyzer 84. An example of a suitable electrical spectrum analyzer is a Model 71400, manufactured and sold by Hewlett-Packard Company.

Figure 8:
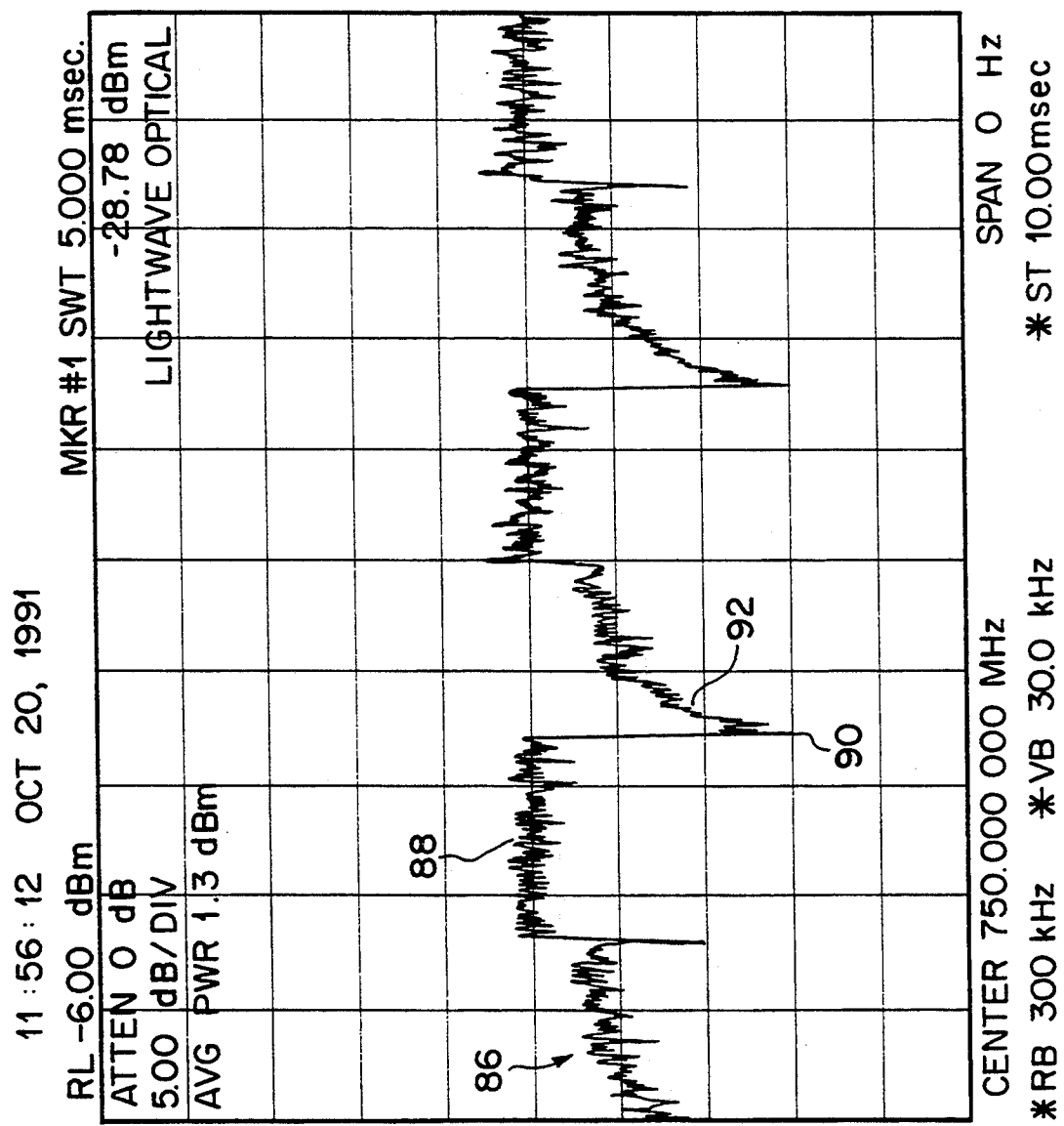
FIG. 8 is a graph of a time domain waveform as observed on the electrical spectrum analyzer shown in FIG. 7.

The detected photocurrent signal is displayed by the electrical spectrum analyzer 84. The electrical spectrum analyzer 84 is set to zero span so that its display shows photocurrent as a function of time. Waveform 86 in FIG. 8 is an example of the signal observed on electrical spectrum analyzer 84. The waveform 86 has a relatively flat peak 88 when the optical signal is on, corresponding to the beat signal between the optical signal and spontaneous emission (signal-spontaneous beat noise). When the optical signal is turned off, the signal-spontaneous beat noise vanishes leaving spontaneous-spontaneous beat noise as the dominant noise. This noise increases with time (indicated at 92) as the optical amplifier 10 recovers from the signal on state to the signal off state.

As with the pulsed source technique using an optical spectrum analyzer as described above, the important information regarding ASE noise is located at the null point 90 of the waveform, which occurs immediately after the optical signal is switched off. At this point, if the noise floor of the electrical spectrum analyzer is sufficiently below the null point, the null point 90 is a measure of the noise that exists in the presence of an optical signal. Extrapolation can be utilized to determine the null point from the observed waveform, if the electrical spectrum analyzer response is too slow to faithfully reproduce the ASE transient.

The noise at the null point can be expressed mathematically such that the actual ASE noise that passed through the bandwidth of optical filter 80 can be determined. The relation between the optical ASE spectral density and the displayed power spectrum $S_i(\omega)$ is given as:

$$S_i(\omega) = q^2 \sigma^2 S_{ase}^2(\lambda) \Delta \nu$$

where q is the electrical charge, $\sigma$ is the detector quantum efficiency to photon energy ratio, $S_{ase}^2(\lambda)$ is the square of the ASE spectral density and $\Delta \nu$ is the optical filter bandwidth. The ASE spectral density is obtained from the above relationship, and the noise figure is calculated as described below. An advantage of the technique using an electrical spectrum analyzer is that source intensity noise and sidemodes do not create measurement problems.

The technique for measuring ASE noise using an electrical spectrum analyzer, as shown in FIGS. 7 and 8 and described above, differs from the technique utilizing an optical spectrum analyzer as follows. When an optical spectrum analyzer is utilized, the photocurrent in the detector is a measure of optical field spectral density. When an electrical spectrum analyzer is utilized, the spectral density of the fluctuation in the photocurrent is observed. The fluctuations are due to mixing of optical components such as spontaneous-spontaneous beat noise. Thus, the null point observed with the electrical spectrum analyzer is representative of mixing of the ASE noise with itself.

The noise performance of an optical amplifier is commonly described in terms of the signal-to-noise ratios before and after the amplifier. The amplifier is assumed to be illuminated by a shot noise limited source. In terms of measurable optical field parameters such as the wavelength, ASE spectral density and optical gain, the signal-spontaneous beat noise limited noise figure NF can be expressed as:

$$NF = 2S(\nu)/Gh\nu$$

where $S(\nu)$ is the ASE spectral density in a single spatial mode at optical frequency $\nu$, G is the amplifier gain and h is Planck's constant. Thus, when the ASE noise is determined in accordance with the present invention, the noise figure can be calculated from the above equation.

The optical signal generator 16 and the switch 18 shown in FIGS. 1 and 7 can be implemented in a variety of ways. The switch 18 can be implemented by mechanically chopping a continuous optical signal. Alternatively, the optical signal can be electronically pulsed by pulsing the current of an injection current laser or by pulsing an optical intensity modulator. The switching technique should provide a relatively fast transition between the on and off states of the optical signal. Preferably, the optical signal is switched from on to off in five microseconds or less. It will be understood that the optical signal generator 16 can include an isolator to prevent reflections to the optical source and can include a narrow band optical filter to select the desired optical signal. While the technique of the invention has been described in connection with an erbium-doped fiber amplifier, it will be understood that the invention can be applied to any optical amplifier having an ASE transient that is measurable by the optical spectrum analyzer, photodetector or other measuring equipment.

In an example of the present invention, a DFB laser was used as the optical source to measure the ASE noise in an erbium-doped fiber amplifier. A Hewlett-Packard Model 71451A Optical Spectrum Analyzer was used to measure the ASE noise. Although the DFB sidemodes (close in) measured before the erbium-doped fiber amplifier were greater than 37 dB below the carrier, there was still considerable structure on the power spectrum about the signal. The DFB laser signal was chopped mechanically and passed to the input of the EDFA. The optical spectrum analyzer was tuned to the DFB laser wavelength, and the span was set to zero. The EDFA consisted of 8 meters of 400 parts per million, erbium-doped fiber pumped at 980 nanometers. An isolator at the input of the EDFA helped to reduce two pass noise generation due to reflections at the input connector, but decreased net gain. The chopper driver provided an electrical signal to the external trigger input of the optical spectrum analyzer for synchronization.

The resulting optical spectrum analyzer display corresponds to that shown in FIG. 2. The input optical signal power was approximately 50 microwatts. The amplified signal is present until the input is blocked by the opaque portion of the chopper. The ASE noise then goes through a positive-going ASE transient as it recovers from its compressed level to its value when no signal is present. At low signal levels, the ASE transient has an exponential response, with a time constant that is strongly dependent on EDFA pump power. When the signal is passed by the chopper into the amplifier, another transient is observed as the EDFA gain falls to its saturated value. The ASE noise level was measured at the moment the signal was blocked. Since the ASE noise recovery process takes a finite amount of time, its trajectory is determined, and the ASE noise level is determined by extrapolation.

Figure 5:
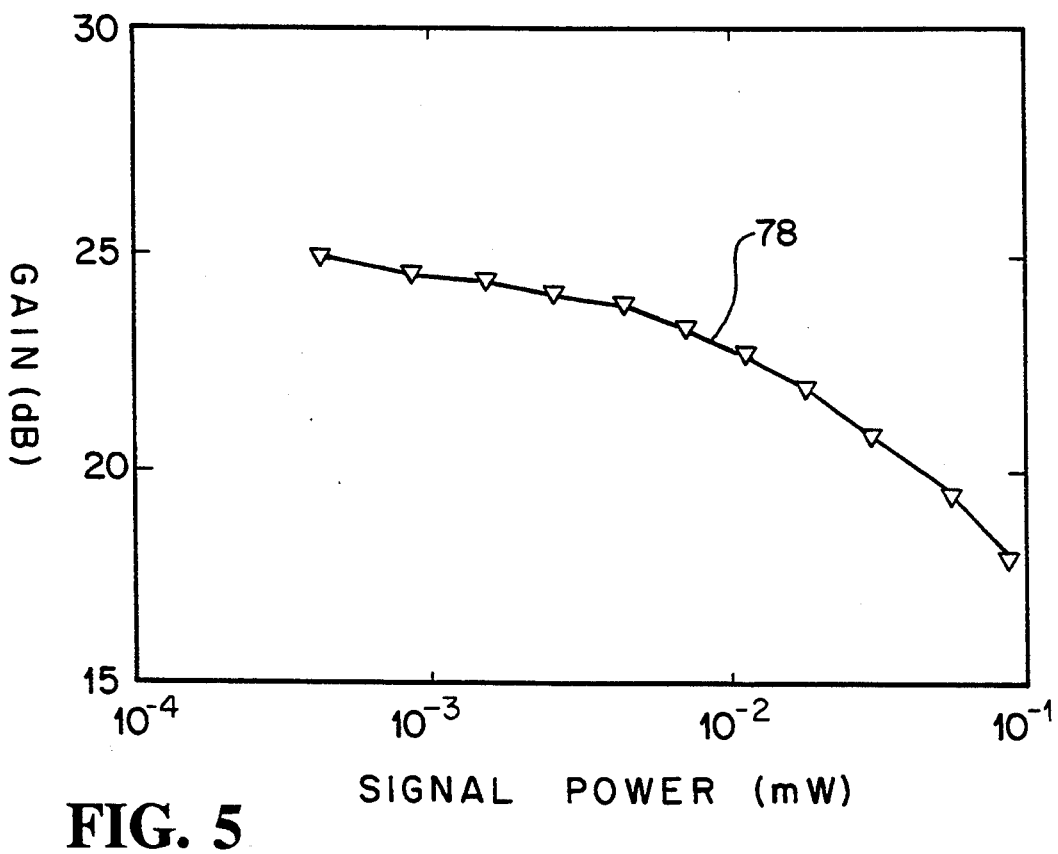
FIG. 5 is a graph of gain as a function of signal power for an erbium-doped fiber amplifier at a signal wavelength of 1544 nanometers.
Figure 6:
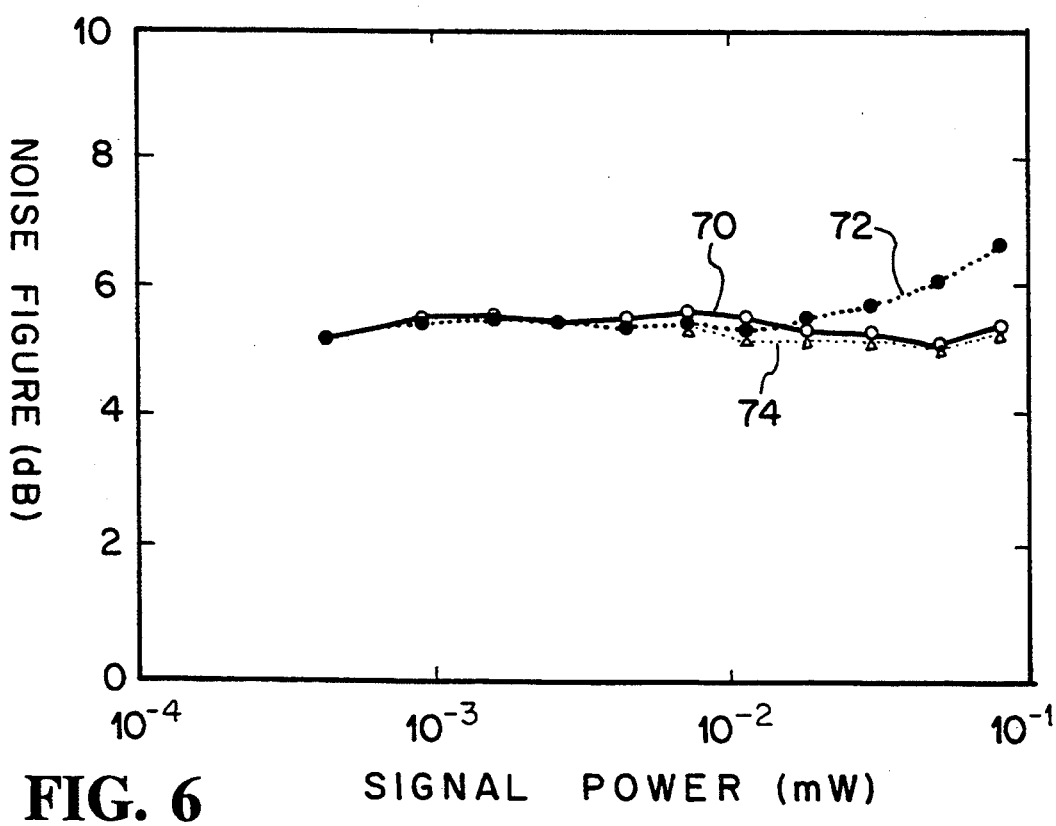
FIG. 6 is a graph of noise figure as a function of signal power for an erbium-doped fiber amplifier, as measured in accordance with the present invention and in accordance with a prior art technique.

Gain and noise figure measurements are shown in FIGS. 5 and 6, respectively. The noise figure measurements made with the technique of the present invention, as indicated by curve 70 (hollow circles), are compared to measurements using the prior art technique of offset measurement of ASE noise about the carrier and interpolation, as indicated by curve 72 (dark circles) and curve 74 (triangles). Curve 72 corresponds to the noise figure obtained by measurements at the sidemode peaks nearest the signal, and curve 74 corresponds to the noise figure obtained by measurements taken at the lowest ASE noise density near the carrier. Curve 70, obtained by measurements according to the present invention, was obtained by a straight line fit of the first two data points in the transient response time record. The noise figure exhibits a dip near −10 dBm input signal power, which may be explained by the effects of signal saturation and backward traveling ASE noise. The gain as a function of signal power is represented by curve 78 in FIG. 5. The gain reduction for increased signal power is demonstrated.

Thus far, the pulsed source technique for measuring ASE noise has been described in connection with optical signal on and off times that are longer than the time constant for gain reduction or gain recovery of the optical amplifier 10, thus permitting recovery of the amplifier output between pulses, as shown in FIGS. 2 and 8. According to another feature of the invention, the optical source can be modulated at a relatively high rate that is much faster than the gain of the optical amplifier can change. Typically, pulse repetition rates greater than 25 KHz are utilized. In this case, the value of the optical amplifier output signal immediately after the optical signal is switched off represents the ASE noise. In this case, the transient output signal, as shown for example in FIG. 2, is not observed. When this technique is utilized, the power level of the optical source must be doubled in order to measure ASE noise at an equivalent optical signal level.

The invention has been described with reference to measurement of the ASE noise of an optical amplifier. However, the invention can be utilized for measurement of ASE noise in any optical circuit where this parameter is of interest.

The pulsed source technique of the present invention for measuring ASE noise has an advantage over prior art techniques in that it lends itself to automated measurements, since careful observation of ASE spectral structure is not required. Furthermore, polarization converters are not necessary. The technique of the present invention may be particularly useful for noise figure measurements where the optical amplifier is illuminated by several signals, as would occur in wavelength division multiplexed communications. While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for determining the amplified spontaneous emission noise of an optical circuit in the presence of an optical signal, comprising the steps of:
   applying an optical signal of prescribed intensity to an input of an optical circuit under test;
   rapidly switching the applied optical signal off; and
   detecting an output signal from the optical circuit slightly after the optical signal is switched off, said output signal representing the amplified spontaneous emission noise of the optical circuit in the presence of an optical signal of the prescribed intensity.

2. A method as defined in claim 1 wherein the steps of applying an optical signal and rapidly switching the optical signal off include applying a pulsed optical signal to the input of the optical circuit.

3. A method as defined in claim 2 wherein the step of applying a pulsed optical signal includes mechanically chopping a continuous optical signal.

4. A method as defined in claim 2 wherein the step of applying a pulsed optical signal includes electronically modulating a continuous optical signal.

5. A method as defined in claim 1 wherein the output signal of the optical signal is a transient output signal and further comprising the step of extrapolating the transient output signal to a time immediately after the optical signal is switched off, the value of the transient output signal immediately after the optical signal is switched off representing the amplified spontaneous emission noise of the optical circuit in the presence of an optical signal of the prescribed intensity.

6. A method as defined in claim 1 wherein the step of detecting the output signal is performed with an optical spectrum analyzer set to zero span and set to the wavelength of the optical signal, said optical spectrum analyzer providing a time domain display of said output signal.

7. A method as defined in claim 1 wherein the step of detecting the output signal includes passing the output signal through a narrow band optical filter and detecting the filtered output signal with a high speed photodetector.

8. A method as defined in claim 1 wherein the step of applying an optical signal includes applying a substantially monochromatic optical signal.

9. A method as defined in claim 1 wherein the optical circuit under test is an erbium-doped fiber optical amplifier.

10. A method as defined in claim 1 wherein the step of detecting the output signal includes determining the intensity of the output signal immediately after the optical signal is switched off.

11. A method as defined in claim 1 wherein the step of switching the applied optical signal off is performed in about 5 microseconds or less.

12. A method as defined in claim 1 wherein the step of detecting the output signal includes passing the output signal through a narrow band optical filter, detecting the filtered output signal with a high speed photodetector and applying the detected output signal to an electrical spectrum analyzer set to zero span such that the electrical spectrum analyzer provides a time domain display of said output signal.

13. A method as defined in claim 2 wherein the step of applying a pulsed optical signal includes modulating said optical signal from on to off at a pulse repetition rate that is much faster than the transient response of the optical circuit to a pulsed optical signal.

14. Apparatus for determining the amplified spontaneous emission noise of an optical circuit in the presence of an optical signal, comprising:
    means for applying a pulsed optical signal of prescribed intensity to an input of an optical circuit under test; and
    means for detecting an output signal from the optical circuit slightly after the pulsed optical signal is switched from on to off, said output signal representing the amplified spontaneous emission of the optical circuit in the presence of an optical signal of the prescribed intensity.

15. Apparatus as defined in claim 14 wherein said means for applying a pulsed optical signal comprises a substantially monochromatic optical source and means for switching an output of said optical source from on to off.

16. Apparatus as defined in claim 15 wherein said means for switching comprises a mechanical chopper.

17. Apparatus as defined in claim 15 wherein said means for switching comprises means for electronically modulating the output of said optical source.

18. Apparatus as defined in claim 14 wherein said means for detecting said output signal comprises an optical spectrum analyzer set to zero span and set to the wavelength of said optical signal so that said optical spectrum analyzer provides a time domain display of said output signal.

19. Apparatus as defined in claim 14 wherein said means for detecting said output signal comprises a narrow band optical filter for providing a filtered output signal and a high speed photodetector for detecting the filtered output signal.

20. Apparatus as defined in claim 14 wherein said means for detecting said output signal comprises a narrow band optical filter for providing a filtered output signal, a high speed photodetector for detecting the filtered output signal and an electrical spectrum analyzer set to zero span for providing a time domain display of the detected output signal.

21. Apparatus as defined in claim 15 wherein said means for switching includes means for modulating an output of said optical source at a pulse repetition rate that is much faster than the transient response of the optical circuit to a pulsed optical signal.

22. A method for determining the amplified spontaneous emission noise of an optical circuit in the presence of an optical signal, comprising the steps of:
    applying a pulsed optical signal of known intensity and wavelength to an input of an optical circuit under test;
    detecting a transient output signal from the optical circuit slightly after the pulsed optical signal is switched from on to off; and
    extrapolating the transient output signal to a time immediately after the optical signal is switched off, the value of the transient output signal immediately after the optical signal is switched off representing the amplified spontaneous emission noise of the optical circuit in the presence of an optical signal of the known intensity and wavelength.

* * * * *